Patented Oct. 11, 1938

2,133,100

UNITED STATES PATENT OFFICE 2,133,100

PRODUCING AZANTHRACENE DERIVATIVES

Karl Koeberle and Ernst Ploetz, Ludwigshafen-on-the-Rhine, Germany, assignors to General Aniline Works, Inc., New York, N. Y., a corporation of Delaware No Drawing. Application July 24, 1934, Serial No. 736,778. In Germany August 5, 1933

6 Claims. (Cl. 260—269)

The present invention relates to azanthracene derivatives and a process of producing same.

We have found that azanthracene derivatives are obtained in a simple manner by converting 2-naphthylamines which contain in the 1-position a substituent attached to the naphthalene nucleus by means of a C—C-linkage such as 1-methyl-, 1-ethyl-, 1-phenyl-, 1-benzyl-, 1-naphthyl-2-amino or 1-benzoyl-2-amino-naphthalene into meso substitution products of azanthracene by means of glycerine or other compounds suitable for the formation of quinoline.

The formation of the quinoline ring with the 2-naphthylamine substitution product serving as the initial material may be effected by means of glycerine or chlorinated derivatives thereof, such as dichlorhydrin or epichlorhydrin, while heating in the presence of sulfuric acid and of mild oxidizing agents, such as nitrobenzene, nitrobenzene sulfonic acids or their alkali metal salts, arsenic acid, nitrophenol or picric acid.

The azanthracene derivatives obtainable in good yields and in a state of good purity according to this invention may be substituted according to the usual methods, as for example by treatment with halogen or agents supplying halogen or by treatment with nitrating agents.

The products thus obtainable may be purified by the usual methods, as for example by crystallization, distillation, sublimation or by way of their salts with strong acids. They are valuable intermediate products for the preparation of dyestuffs.

The following examples will further illustrate how the said invention may be carried out in practice but the invention is not restricted to these examples. The parts are by weight.

Example 1

100 parts of 2.2'-diamino-1.1'-dinaphthyl, 200 parts of glycerine and 200 parts of meta-nitrobenzene sulfonic acid sodium salt are boiled in 1200 parts of 66 per cent sulfuric acid. After from 4 to 5 hours the whole is allowed to cool, diluted with water and milk of lime is added until the reaction is slightly acid to congo. The solution filtered from calcium sulfate sludge is rendered alkaline with caustic soda solution. The filtered, washed and dried precipitate yields, by repeated boiling with trichlorbenzene, a good yield of beautifully crystallized 9'-azanthracyl-9-azanthrazene which does not melt at 350° centigrade.

According to analysis the formula is $C_{26}H_{16}N_2$ the percentages being:

Calculated: 87.61 C; 4.53 H; 7.87 N
Found:     87.85 C; 4.59 H; 7.86 N

Example 2

25 parts of 2.2'-diamino-1.1'-dinaphthyl are suspended in a mixture of 200 parts of concentrated sulfuric acid with 100 parts of water and 37 parts of epichlorhydrin are added while cooling. In the course of two hours a solution of 30 parts of arsenic acid in 30 parts of 66 per cent sulfuric acid is dropped into the said mixture heated to 140° centigrade. The reaction mixture is heated at about 140° centigrade for 8 hours. It is then poured on to ice and worked up in the manner described in Example 1. The reaction product thus obtained is identical to that obtained according to Example 1.

Example 3

100 parts of 1-methyl-2-naphthylamine are heated to 140° centigrade in a mixture of 1500 parts of 64 per cent sulfuric acid and 100 parts of glycerine. In the course of 2 hours, a solution of 110 parts of arsenic acid in 300 parts of 64 per cent sulfuric acid is allowed to flow in. When the reaction is complete, the mixture is filtered off by suction and the 9-methyl-1-azanthracene formed is isolated in the manner described in Example 1.

What we claim is:

1. A process of producing azanthracene derivatives which comprises heating 2-naphthylamines corresponding to the general formula

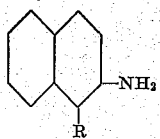

in which R is a substituent of the class consisting of alkyl radicals and aryl radicals containing up to two rings attached to the naphthalene nucleus by means of a C—C-linkage with a compound of the group consisting of glycerine and its chlorinated derivatives in the presence of sulfuric acid and mild oxidizing agents.

2. A process of producing azanthracene derivatives which comprises heating 2-naphthylamines corresponding to the general formula

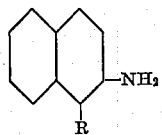

in which R is a substituent of the class consisting of alkyl radicals and aryl radicals containing up to two rings attached to the naphthalene nucleus by means of a C—C-linkage with glycerine in the presence of sulfuric acid and mild oxidizing agents.

3. A process of producing azanthracene derivatives which comprises heating 2-naphthylamines corresponding to the general formula

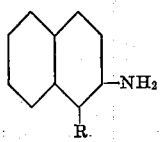

in which R is a substituent of the class consisting of alkyl radicals and aryl radicals containing up to two rings attached to the naphthalene nucleus by means of a C—C-linkage with epichlorhydrin in the presence of sulfuric acid and mild oxidizing agents.

4. A process of producing azanthracene derivatives which comprises heating 2-naphthylamines corresponding to the general formula

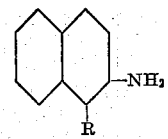

in which R is a substituent of the class consisting of alkyl radicals and aryl radicals containing up to two rings attached to the naphthalene nucleus by means of a C—C-linkage with a compound of the group consisting of glycerine and its chlorinated derivatives in the presence of sulfuric acid and a nitro compound of the benzene series.

5. A process of producing azanthracene derivatives which comprises heating 2-naphthylamines corresponding to the general formula

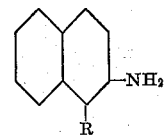

in which R is a substituent of the class consisting of alkyl radicals and aryl radicals containing up to two rings attached to the naphthalene nucleus by means of a C—C-linkage with a compound of the group consisting of glycerine and its chlorinated derivatives in the presence of sulfuric acid and meta-nitrobenzene sulfonic acid.

6. A process of producing azanthracene derivatives which comprises heating 2-naphthylamines corresponding to the general formula

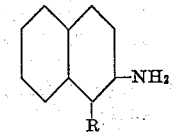

in which R is a substituent of the class consisting of alkyl radicals and aryl radicals containing up to two rings attached to the naphthalene nucleus by means of a C—C-linkage with a compound of the group consisting of glycerine and its chlorinated derivatives in the presence of sulfuric acid and arsenic acid.

KARL KOEBERLE.
ERNST PLOETZ.